(12) United States Patent
Wuidart (10) Patent No.: US 9,508,033 B2
(45) Date of Patent: *Nov. 29, 2016

(54) POWER MANAGEMENT IN AN ELECTROMAGNETIC TRANSPONDER

(75) Inventor: Luc Wuidart, Pourrières (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 1151 days.

This patent is subject to a terminal disclaimer.

(21) Appl. No.: 13/378,625

(22) PCT Filed: Jun. 3, 2010

(86) PCT No.: PCT/FR2010/051091
§ 371 (c)(1),
(2), (4) Date: Dec. 15, 2011

(87) PCT Pub. No.: WO2010/146278
PCT Pub. Date: Dec. 23, 2010

(65) Prior Publication Data
US 2012/0092901 A1    Apr. 19, 2012

(30) Foreign Application Priority Data

Jun. 19, 2009 (FR) ...................... 09 54148

(51) Int. Cl.
*H02M 3/335* (2006.01)
*G06K 19/07* (2006.01)

(52) U.S. Cl.
CPC ....... *G06K 19/0723* (2013.01); *G06K 19/0701* (2013.01); *G06K 19/0702* (2013.01); *G06K 19/0715* (2013.01); *G06K 19/0726* (2013.01)

(58) Field of Classification Search
CPC ......... H04M 1/66; G08B 29/00; H04Q 5/22; G06K 19/0701; G06K 19/0702; G06K 19/0715; G06K 19/0723; G06K 19/0726
USPC ..................... 363/21, 21.09, 21.15
See application file for complete search history.

(56) References Cited

U.S. PATENT DOCUMENTS 5,703,573 A    12/1997   Fujimoto et al.
6,356,198 B1    3/2002   Wuidart
(Continued)

FOREIGN PATENT DOCUMENTS

EP    0 722 094 A1    7/1996
EP    0 857 981 A1    8/1998
(Continued)

OTHER PUBLICATIONS

International Search Report dated Oct. 27, 2010 and an English language translation of the Written Opinion from corresponding International Application No. PCT/FR2010/051091.
(Continued)

*Primary Examiner* — Jessica Han
*Assistant Examiner* — Lorena Bruner
(74) *Attorney, Agent, or Firm* — Seed IP Law Group LLP (57) ABSTRACT

A method for managing the power in an electromagnetic transponder in the field of a terminal, including the steps of: evaluating the power consumption of the transponder circuits; and if this power consumption is below a threshold, evaluating the current coupling factor between the transponder and the terminal and, according to the current coupling: causing an increase of the transponder power consumption or causing a detuning of an oscillating circuit of the transponder.

28 Claims, 5 Drawing Sheets

(56) References Cited

U.S. PATENT DOCUMENTS

| | | |
|---|---|---|
| 6,462,647 B1 | 10/2002 | Roz |
| 6,473,028 B1 | 10/2002 | Luc |
| 6,547,149 B1 | 4/2003 | Wuidart et al. |
| 6,650,226 B1 | 11/2003 | Wuidart et al. |
| 6,650,229 B1* | 11/2003 | Wuidart et al. ............ 340/10.4 |
| 6,703,921 B1 | 3/2004 | Wuidart et al. |
| 6,784,785 B1 | 8/2004 | Wuidart et al. |
| 6,879,246 B2 | 4/2005 | Wuidart |
| 6,944,424 B2 | 9/2005 | Heinrich et al. |
| 6,950,008 B2 | 9/2005 | Hagl et al. |
| 6,960,985 B2 | 11/2005 | Wuidart |
| 7,005,967 B2 | 2/2006 | Wuidart |
| 7,046,121 B2 | 5/2006 | Wuidart |
| 7,049,935 B1 | 5/2006 | Wuidart et al. |
| 7,049,936 B2 | 5/2006 | Wuidart |
| 7,058,357 B1 | 6/2006 | Wuidart et al. |
| 7,107,008 B2 | 9/2006 | Wuidart |
| 7,263,330 B2 | 8/2007 | Wuidart |
| 7,606,532 B2 | 10/2009 | Wuidart |
| 7,995,965 B2 | 8/2011 | Wuidart |
| 8,130,159 B2 | 3/2012 | Wuidart et al. |
| 8,395,485 B2 | 3/2013 | Wuidart |
| 8,446,259 B2 | 5/2013 | Wuidart |
| 8,482,388 B2 | 7/2013 | Wuidart |
| 8,564,413 B2 | 10/2013 | Wuidart |
| 8,676,163 B2 | 3/2014 | Wuidart |
| 8,693,956 B2* | 4/2014 | Wuidart ............ G06K 19/0701 455/67.11 |
| 8,718,552 B2 | 5/2014 | Wuidart |
| 8,798,533 B2 | 8/2014 | Wuidart |
| 8,907,761 B2 | 12/2014 | Wuidart |
| 8,922,338 B2 | 12/2014 | Wuidart |
| 8,922,341 B2 | 12/2014 | Wuidart |
| 8,988,196 B2 | 3/2015 | Wuidart |
| 9,098,788 B2 | 8/2015 | Wuidart |
| 2003/0071717 A1 | 4/2003 | Hagl et al. |
| 2003/0121985 A1 | 7/2003 | Baldischweiler et al. |
| 2003/0169169 A1 | 9/2003 | Wuidart et al. |
| 2004/0104809 A1* | 6/2004 | Rizzo ............ G06K 19/0723 340/10.34 |
| 2005/0001609 A1 | 1/2005 | Cuylen et al. |
| 2005/0141256 A1 | 6/2005 | Yamazaki et al. |
| 2005/0231328 A1 | 10/2005 | Castle et al. |
| 2006/0172702 A1 | 8/2006 | Wuidart et al. |
| 2007/0164122 A1 | 7/2007 | Ju |
| 2008/0079542 A1* | 4/2008 | Rofougaran ....... G06K 19/0723 340/10.1 |
| 2008/0129509 A1 | 6/2008 | Duron |
| 2008/0136643 A1 | 6/2008 | Yeo et al. |
| 2008/0204206 A1 | 8/2008 | Frohler |
| 2009/0065575 A1 | 3/2009 | Phillips et al. |
| 2009/0273452 A1 | 11/2009 | Wuidart |
| 2010/0068999 A1 | 3/2010 | Bangs et al. |
| 2010/0283849 A1 | 11/2010 | Mair |
| 2010/0283698 A1 | 11/2010 | Orihara |
| 2010/0291871 A1 | 11/2010 | Butler |
| 2010/0328045 A1 | 12/2010 | Goto et al. |
| 2011/0095769 A1 | 4/2011 | Wuidart |
| 2011/0140852 A1 | 6/2011 | Wuidart |
| 2011/0193688 A1 | 8/2011 | Forsell |
| 2011/0319016 A1 | 12/2011 | Gormley et al. |
| 2014/0113554 A1 | 4/2014 | Wuidart |
| 2014/0113692 A1 | 4/2014 | Wuidart |
| 2014/0118115 A1 | 5/2014 | Wuidart |

FOREIGN PATENT DOCUMENTS

| | | |
|---|---|---|
| EP | 1 043 677 A1 | 10/2000 |
| EP | 1 071 038 A1 | 1/2001 |
| EP | 1 304 661 A1 | 4/2003 |
| EP | 2 077 518 A1 | 7/2009 |
| EP | 2 114 019 A1 | 11/2009 |
| FR | 2 757 952 A1 | 7/1998 |
| GB | 2 321 725 A | 8/1998 |
| GB | 2464362 A | 4/2010 |
| WO | 2009/105115 A1 | 8/2009 |

OTHER PUBLICATIONS

International Search Report dated Oct. 26, 2010 and an English language translation of the Written Opinion from related International Application No. PCT/FR2010/051090.
U.S. Appl. No. 13/378,614, filed Dec. 15, 2011, Wuidart.
International Search Report dated Sep. 10, 2012, for corresponding International Application No. PCT/FR2012/050842, 2 pages.
International Search Report dated Jun. 26, 2012, for corresponding International Application No. PCT/FR2012/050843, 2 pages.
International Search Report dated Sep. 7, 2012, for corresponding International Application No. PCT/FR2012/050844, 2 pages.
International Search Report dated Sep. 7, 2012, for corresponding International Application No. PCT/FR2012/050845, 2 pages.
French Search Report dated Feb. 9, 2010, for corresponding FR Application No. 0954147, 2 pages.
French Search Report dated Feb. 9, 2010, for corresponding FR Application No. 0954148, 2 pages.
French Search Report dated Feb. 8, 2010, for corresponding FR Application No. 0954149, 2 pages.
French Search Report dated Feb. 2, 2010, for corresponding FR Application No. 0954345, 2 pages.
French Search Report dated Feb. 3, 2010, for corresponding FR Application No. 0954347, 2 pages.
French Search Report dated Feb. 17, 2010, for corresponding FR Application No. 0954351, 2 pages.
Written Opinion dated Dec. 4, 2013, for corresponding International Application No. PCT/FR2012/050842, 5 pages.
Written Opinion dated Dec. 4, 2013, for corresponding International Application No. PCT/FR2012/050843, 10 pages.
Written Opinion dated Dec. 4, 2013, for corresponding International Application No. PCT/FR2012/050844, 6 pages.
Written Opinion dated Dec. 4, 2013, for corresponding International Application No. PCT/FR2012/050845, 6 pages.

* cited by examiner

POWER MANAGEMENT IN AN ELECTROMAGNETIC TRANSPONDER

CROSS REFERENCE TO RELATED APPLICATIONS

This application is a U.S. National stage patent application based on International patent application number PCT/FR2010/051091, filed on Jun. 3, 2010, which application claims the priority benefit of French patent application number 09/54148, filed on Jun. 19, 2009, which applications are hereby incorporated by reference to the maximum extent allowable by law.

BACKGROUND

1. Field

At least one embodiment generally relates to electronic systems, and more specifically to systems using electromagnetic transponders, that is, transceivers capable of being interrogated contactless and wireless by a read and/or write terminal.

2. Discussion of the Related Art

There are many communication systems based on a modulation of an electromagnetic field generated by a terminal. They range from a simple electronic tag used as a theft-prevention device to more complex systems where a transponder intended to communicate with the terminal when present in the field thereof, is equipped with calculation functions (electronic purse, for example) or data processing functions.

Electromagnetic transponder systems are based on the use of oscillating circuits comprising a winding forming an antenna, on the transponder side and on the terminal side. Such circuits are intended to be coupled by near magnetic field when the transponder enters the field of the terminal. The oscillating circuits of the terminal and of the transponder are generally tuned to a same frequency corresponding to the excitation frequency of the oscillating circuit of the terminal.

In most cases, transponders have no autonomous power supply and extract the power supply necessary to their circuits from the high-frequency field radiated by the antenna of the terminal.

The quality of the communication and of the possible power transfer depends on the coupling between the terminal and the transponder. This coupling, which is inversely proportional (non linear) to the distance between the terminal and the transponder, conditions the amplitude of the voltage recovered by the transponder. It is thus needed to be able to evaluate the current coupling factor between a transponder and a terminal having it in its field.

The transponder thus recovers a power supply voltage which strongly depends on the coupling, and thus on the power consumption of the transponder circuits. For example, a decrease in the load (transponder power consumption) causes an increase of the voltage and of the remote-supply power. According to the current value of the coupling with respect to the optimum coupling, a load decrease may result in having the coupling approach the critical optimum coupling. The transponder then is in a paradoxical situation where its circuits consume less but where the voltage and the remote-supply power reach a maximum. For a current coupling k close to the optimum coupling, this maximum remote-supply power is not consumed by the transponder circuits and the power should thus be dissipated in the resonant circuit, thus causing an overheating of the antenna. This overheating may even cause the disconnection of the antenna contacts and thus the destruction of the transponder.

A conventional solution is to detune the transponder when the voltage across the oscillating circuit exceeds a threshold.

Causing a detuning risks worsening the situation by increasing the remote-supply power. Indeed, the detuning may be such that it corresponds to one of the maximum values of the transferred power for the detuned value. In this case, not only does the detuning not solve the problem, but it also worsens it. As a result, when modifying the transponder load by switching a resistor in parallel on the resonant circuit or when detuning said transponder by means of a switchable capacitance, without knowing the position of the current coupling with respect to the optimum coupling, there is a fifty-fifty chance to worsen the situation.

SUMMARY

It would be desirable to be able to evaluate the coupling factor between a transponder and a terminal.

It would also be desirable to be able to evaluate the variation of this coupling factor during a communication.

It would also be desirable to be able to evaluate the coupling factor without it being necessary to perform a data exchange between the terminal and the transponder.

It would also be desirable to be able to perform this evaluation on the transponder side.

It would also be desirable to provide a solution independent from the type of terminal having the transponder in its field.

To achieve all or part of these and other objects, at least one embodiment provides a method for managing the power in an electromagnetic transponder in the field of a terminal, comprising the steps of:

evaluating the power consumption of the transponder circuits; and if this power consumption is below a threshold, evaluating the current coupling factor between the transponder and the terminal and, according to the current coupling:

causing an increase of the transponder power consumption; or causing a detuning of an oscillating circuit of the transponder.

According to an embodiment, the detuning is performed towards a value maintaining a remote supply of the transponder.

According to an embodiment, the evaluation of the coupling factor comprises a comparison of a ratio of the current coupling factor of the transponder with the terminal to a position of optimum coupling with a value of a resistive load.

According to an embodiment, the ratio is obtained from data representative of a voltage across an oscillating circuit of the transponder and obtained for two values of the resistive load.

According to an embodiment:

first data, relative to the level of a D.C. voltage provided by a rectifier across the oscillating circuit, are measured and stored for a first resistive load value; and second data, relative to the level of said D.C. voltage, are measured and stored for a second resistor load value.

According to an embodiment, a variation of the resistive load between the first and second values is obtained by modifying the power consumption of processing circuits comprised by the transponder.

According to an embodiment, a variation of the resistive load between the first and second values is obtained by switching a resistive retromodulation element comprised by the transponder.

At least one embodiment also provides an electromagnetic transponder comprising:

an oscillating circuit upstream of a rectifying circuit capable of providing a D.C. voltage when the transponder is in the magnetic field of a terminal; and at least one processing unit programmed to implement the power management method.

According to an embodiment, the transponder further comprises at least one switchable resistive element capable of being functionally connected in parallel to the oscillating circuit.

According to an embodiment, the transponder comprises at least one switchable capacitive element for detuning the oscillating circuit.

BRIEF DESCRIPTION OF THE DRAWINGS

The foregoing and other objects, features, and advantages will be discussed in detail in the following non-limiting description of specific embodiments in connection with the accompanying drawings.

DETAILED DESCRIPTION

The same elements have been designated with the same reference numerals in the different drawings. For clarity, only those steps and elements which are useful to the understanding embodiments have been shown and will be described. In particular, the communications between the transponder and the terminal have not been detailed, embodiments being compatible with any usual communication. Further, the functions likely to be implemented by a terminal or by a transponder, other than the determination of the coupling factor by this transponder, have not been detailed either, embodiments being here again compatible with any usual function of a terminal or of a transponder.

Figure 1:
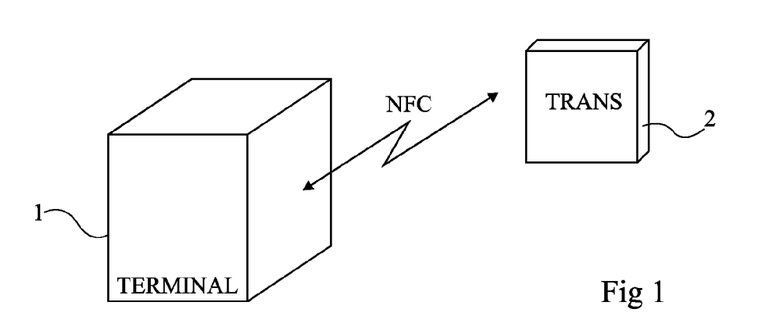
FIG. 1 is a very simplified representation of a transponder system of the type to which at least one embodiment applies as an example.

FIG. 1 is a block diagram of an electromagnetic transponder communication system. A terminal 1 (TERMINAL) is capable of communicating in near field (for example according to a near field communication protocol NFC) with a distant element, that is, a transponder 2 (TRANS).

The terminal may take different forms, for example, a transport ticket validation terminal, an electronic passport reader, a laptop computer, a mobile telecommunication device (cell phone, PDA, etc.), an electronic control unit for starting an automobile vehicle, etc.

The transponder may similarly take different forms, for example, a chip card, an electronic transport ticket, an electronic passport, a telecommunication terminal (cell phone, PDA, etc.), an electronic tag, etc.

Figure 2:
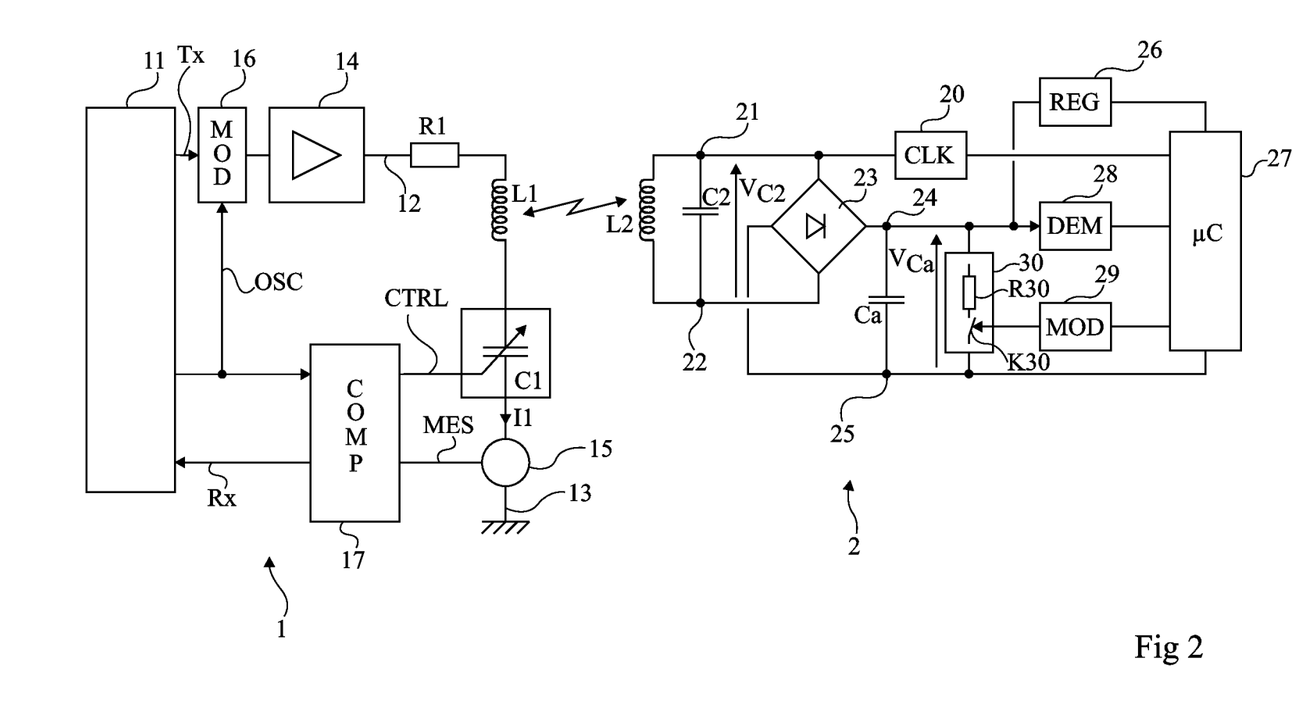
FIG. 2 is a simplified block diagram of a terminal and of a transponder of an electromagnetic transponder communication system.

FIG. 2 very schematically shows a simplified example of a terminal 1 and of a transponder 2.

Terminal 1 comprises an oscillating circuit, generally in series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, which have not been detailed. The elements of terminal 1 most often draw the power necessary to their operation from a supply circuit (not shown) connected, for example, to the power line distribution system (mains) or to a battery (for example, that of an automobile vehicle or of a portable telephone or computer). Modulator 16 provides a high-frequency carrier (for example, at 13.56 MHz) to series oscillating circuit L1-C1, which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the signal of the carrier corresponding to the signal provided to amplifier 14 in the absence of data Tx to be transmitted. The regulation is performed by varying capacitance C1 of the oscillating circuit of the terminal to maintain the current in the antenna in constant phase relationship with a reference signal. This reference signal for example corresponds to signal OSC provided to modulator 14. Signal CTRL originates from a circuit 17 (COMP) having the function of detecting the phase interval with respect to the reference signal and of accordingly modifying the capacitance of element C1. The comparator receives data MES relative to current I1 in the oscillating circuit detected by measurement element 15 (for example, an intensity transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive mode resonant circuit) is intended to capture the magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller µC) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated in a same chip.

To transmit data from terminal 1 to the transponder, circuit 16 modulates (generally in amplitude) the carrier (signal OSC) according to signal Tx. On the side of transponder 2, these data are demodulated by demodulator 28 based on voltage $V_{Ca}$. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally with a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal constant. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx giving back to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is sufficiently long to avoid disturbing the possible retromodulation from a transponder and sufficiently short as compared with the speed at which a transponder passes in the field of the terminal. One can speak of a static regulation with respect to the modulation frequencies (for example, the 13.56-MHz frequency of the remote supply carrier and the 847.5-kHz retromodulation frequency used to transmit data from the transponder to the terminal).

An example of a phase regulation terminal is described in document EP-A-0857981.

The fact that the phase is regulated on the terminal side enables using current and voltage measurements in the oscillating circuit of the transponder to deduce therefrom information relative to the transponder coupling when it is in the field of the terminal. The coupling coefficient between the oscillating circuits of the terminal and of the transponder essentially depends on the distance separating the transponder from the terminal. The coupling coefficient, noted k, always is between 0 and 1. It can be defined by the following formula:

$$k = \frac{M}{\sqrt{L1 \cdot L2}}, \qquad \text{(Formula 1)}$$

where M represents the mutual inductance between inductances L1 and L2 of the oscillating circuits of the terminal and of the transponder.

An optimum coupling is defined as being the position at which voltage $V_{C2}$ across the oscillating circuit of the transponder is at its maximum. This optimum coupling, noted $k_{opt}$, may be expressed as:

$$k_{opt} = \sqrt{\frac{L2}{L1} \cdot \frac{R1}{R2}}, \qquad \text{(Formula 2)}$$

where R2 represents the resistance equivalent to the load formed by the elements of the transponder on its own oscillating circuit. In other words, resistor R2 represents the equivalent resistance of all the circuits (microprocessor, retromodulation means, etc.) of transponder 2, placed in parallel on capacitor C2 and inductance L2 (before or after the rectifying bridge). The conductance due to the transponder circuits, and thus their power consumption, will be called "resistive load". The level of this load is symbolized by resistor R2 in parallel across the oscillating circuit. In above formula 2, the series resistance of inductance L1 (terminal antenna) has been neglected. It can also be considered that the value of this series resistance is, for simplification, included in the value of resistor R1.

Figure 3:
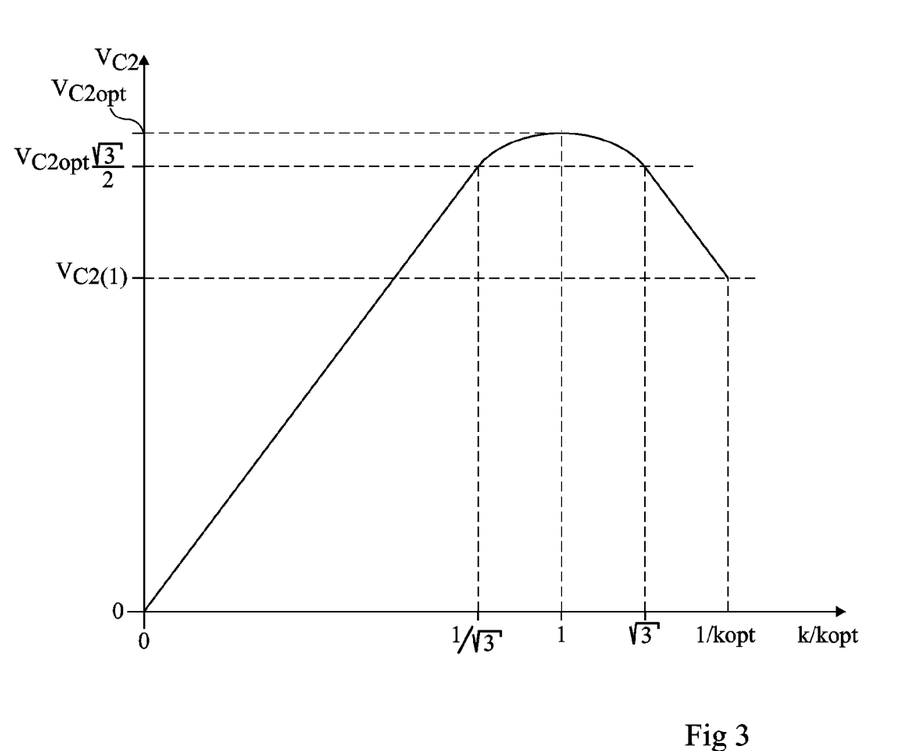
FIG. 3 illustrates an example of the shape of the voltage across the oscillating circuit of the transponder according to the coupling factor.

FIG. 3 shows an example of the shape of voltage $V_{C2}$ recovered on the transponder side according to the coupling $k/k_{opt}$ normalized with respect to the optimum coupling. The curve starts from the origin of ordinates (zero voltage) for a zero coupling. This corresponds to a distance of the transponder to the terminal such that no signal can be sensed by the transponder. Voltage $V_{C2}$ reaches a maximum value $V_{C2opt}$ for optimum coupling coefficient $k_{opt}$ ($k/k_{opt}=1$), then decreases to an intermediary value $V_{C2}(1)$ reached at coupling k=1.

As illustrated in FIG. 3, voltage $V_{C2}$ crosses two points of inflection for coupling values corresponding to ratios $k/k_{opt}=1/\sqrt{3}$ and $k/k_{opt}=\sqrt{3}$, for which voltage $V_{C2}$ takes value $$V_{C2opt} \cdot \frac{\sqrt{3}}{2}.$$

To evaluate, on the transponder side, the coupling of this transponder with the terminal, the information of voltage $V_{C2}$ across capacitive element C2 of its oscillating circuit is exploited. This voltage is provided by the following relation:

$$V_{C2} = \frac{I2}{\omega \cdot C_2}, \quad \text{(Formula 3)}$$

where I2 represents the current in the oscillating circuit of the transponder, and where ω represents the pulse of the signal.

Current I2 is equal to:

$$I2 = \frac{M \cdot \omega \cdot I1}{Z2}, \quad \text{(Formula 4)}$$

where I1 represents the current in the oscillating circuit of the terminal and where Z2 represents the transponder impedance.

Impedance Z2 of the transponder is provided by the following relation:

$$Z2^2 = X2^2 + \left(\frac{L2}{R2 \cdot C2}\right)^2, \quad \text{(Formula 5)}$$

where X2 represents the imaginary part of the impedance of the oscillating circuit:

$$X2 = \omega \cdot L2 - \frac{1}{\omega \cdot C2}. \quad \text{(Formula 6)}$$

Further, current I1 in the oscillating circuit of the terminal is given by the following relation:

$$I1 = \frac{Vg}{Z1_{app}}, \quad \text{(Formula 7)}$$

where Vg designates a so-called generator voltage, exciting the oscillating circuit of the terminal, and where $Z1_{app}$ represents the apparent impedance of the oscillating circuit.

Regulating the phase of the oscillating circuit of the terminal enables that all the variations which would tend to modify, statically with respect to the modulation frequencies, the imaginary part of the load formed by the transponder, are compensated by the phase regulation loop. It is thus ensured that in static operation, the imaginary part of impedance $Z1_{app}$ is zero. Accordingly, impedance $Z1_{app}$ becomes equal to apparent resistance $R1_{app}$ (real part of the impedance) and may be expressed as:

$$Z1_{app} = R1_{app} = R1 + \frac{k^2 \cdot \omega^2 \cdot L1 \cdot L2^2}{Z2^2 \cdot R2 \cdot C2}. \quad \text{(Formula 8)}$$

When the oscillating circuits are tuned, it can be considered that imaginary part X2 of impedance Z2 is, as a first approximation, close to zero. As a result, the value of impedance Z2 comes down to its real part:

$$Z2 = \frac{L2}{R2 \cdot C2}. \quad \text{(Formula 9)}$$

By inserting this simplification into formulas 4 and 8, and inserting formula 4 into formula 3, the following formula can be obtained for voltage $V_{C2}$ recovered across the oscillating circuit of the transponder, noted $V_{C2tun}$ when the latter is tuned:

$$V_{C2} = k \cdot \sqrt{\frac{L1}{L2}} \cdot \frac{Vg}{\frac{R1}{R2} + k^2 \cdot \frac{L1}{L2}}. \quad \text{(Formula 10)}$$

In optimum coupling position $k_{opt}$, maximum voltage $V_{C2(kopt)}$ is thus provided by the following formula (combining formulas 2 and 9):

$$V_{C2kopt} = \frac{Vg}{2} \cdot \sqrt{\frac{R2}{R1}}. \quad \text{(Formula 11)}$$

It should be noted that formula 10 can only apply when an oscillating circuit of transponder L2-C2 is considered to be set to the tuning frequency, that is, to $\omega \cdot \sqrt{L2 \cdot C2} = 1$.

By combining formulas 10 and 11 and expressing the coupling as normalized by the optimum coupling ($k/k_{opt}$), the following expression of voltage $V_{C2}$ is obtained:

$$V_{C2} = \frac{2 \cdot V_{C2kopt}}{\frac{k}{k_{opt}} + \frac{k_{opt}}{k}}. \quad \text{(Formula 12)}$$

For a given coupling value k, considering that the impedance of the oscillating circuit of the terminal does not vary and that the circuits remain tuned, the ratio of current coefficients k to optimum coefficients $k_{opt]R20}$ and $k_{opt]R21}$, respectively for a resistor R2 of value R20 and of value R21 provides, according to formula 2, the following expression:

$$\frac{\frac{k}{k_{opt]R20}}}{\frac{k}{k_{opt]R21}}} = \sqrt{\frac{R20}{R21}}. \quad \text{(Formula 13)}$$

Still, for a given coupling value k and considering that the impedance of the oscillating circuit of the terminal does not vary and that the circuits remain tuned, the ratio of values $V_{C2]R21}$ and $V_{C2]R20}$ of voltage $V_{C2}$, respectively for values R21 and R20 of resistor R2, provides the following relation:

$$\frac{V_{C2]R21}}{V_{C2]R20}} = \frac{\left(\frac{k}{k_{opt]R20}}\right)^2 + 1}{\left(\frac{k}{k_{opt]R20}}\right)^2 + \frac{R20}{R21}}. \quad \text{(Formula 14)}$$

Formula 14 shows that if the value of resistor R2 is increased from a first value R20 to a second greater value R21 (which amounts to decreasing the load of the transponder circuits on oscillating circuit L2-C2), voltage $V_{C2]R21}$ will be greater than voltage $V_{C2]R20}$.

Formula 14 may also be written as follows:

$$\left(\frac{k}{k_{opt|R20}}\right)^2 = \frac{1 - \frac{V_{C2|R21}}{V_{C2|R20}} \cdot \frac{R20}{R21}}{\frac{V_{C2|R21}}{V_{C2|R20}} - 1}. \quad \text{(Formula 15)}$$

Formula 15 shows that based on a measurement of voltage $V_{C2}$ with the two resistance values R20 and R21, the ratio of the current coupling to the optimum coupling with the load equivalent to resistance R20 may be obtained, which provides indirect information as to the position of the current coupling with respect to the optimum coupling with resistance R20. For this evaluation, a value R21 of resistor R2 greater than value R20 will preferably be selected.

However, this information is not sufficient to know whether there is a risk of overheating of the resonant circuit. This risk exists as soon as the current consumed by the transponder circuits is lower than a given value and current coupling k is close to the optimum coupling. Indeed, in the area where coupling k is close to the optimum value, the maximum power is transferred to the entire transponder regardless of the load level (regardless of the value of resistance R2) since at the optimum coupling, power $P_{opt}$ only depends on generator voltage Vg and on resistance R1 of the terminal. Indeed, power $P_{opt}$ is $V_{C2(kopt)}^2/R2$ (formula 16). Using formula 11, one obtains: $P_{opt} = Vg^2/4*R1$ (formula 17). This maximum power transferred from the terminal to the transponder distributes between the internal loss resistance in the resonant circuit and resistance R2 corresponding to the power consumption level of the transponder circuits. When the consumed current becomes too low, this means that the value of R2 becomes very high and is thus negligible as compared with the internal resistance of resonant circuit L2-C2. The transferred power should thus be dissipated in this internal resistor of the LC circuit, which risks deteriorating the antenna.

Figure 4:
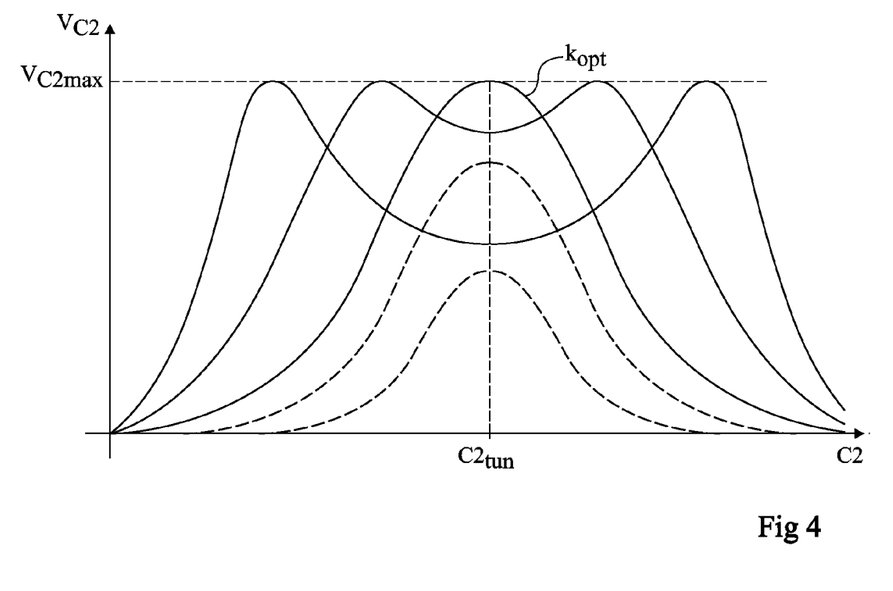
FIG. 4 illustrates, for several coupling factors, examples of the shape of the voltage across the oscillating circuit of the transponder according to the value of its capacitance.

FIG. 4 illustrates the effects of a detuning of the oscillating circuit according to the position of the coupling with respect to the optimum coupling. This drawing shows examples of shapes of voltage $V_{C2}$ according to the value of capacitance C2 for several values of coupling k. It is assumed that the value of resistance R2 does not vary. At optimum coupling $k_{opt}$, the maximum value of voltage $V_{C2max}$ is obtained when the oscillating circuit is tuned (for simplification, it is considered that a possible detuning is only caused by a variation of capacitance C2 and that the value of inductance L2 remains fixed). For couplings lower than the optimum coupling (dotted lines in FIG. 4), the maximum obtained voltage is necessarily smaller than the maximum value at the optimum coupling and decreases with respect to this value in case of a detuning with respect to value $C2_{tun}$. However, for couplings greater than the optimum coupling, it can be seen that voltage $V_{C2max}$ can be reached even with a detuned circuit. Accordingly, the detuning of the oscillating circuit for protection against an overheating is not always the solution either.

Accordingly, it is provided to decrease the maximum power differently according to whether the current coupling is rather greater or rather lower than the optimum coupling.

When the current coupling is lower than the optimum coupling, a detuning of the oscillating circuit is caused, preferably by modification of the value of capacitance C2.

Indeed, it is easy to increase or to decrease the value of the capacitance by switching integrated capacitive elements in parallel with capacitance C2.

It may also be provided to detune the circuit by switching an array of antennas modifying the value of inductance L2. However, a capacitive detuning will often be easier to implement.

It will be ascertained for the detuning not to be too strong, to help the transponder keeps its remote supply.

When the current coupling is greater than the optimum coupling, detuning the oscillating circuit should be avoided, to avoid risking to have the new capacitance value coincide with one of the two maximum voltage values which surround the optimum coupling (see FIG. 4).

It is thus provided, in this case, to decrease value R20 of resistance R2 down to a value R2$x$ such that the optimum coupling corresponding to this load level is reached.

Once voltage $V_{C2|R2x}$ corresponding to the optimum coupling has been reached for a value R2$x$<R20, the transponder then is in good conditions to be detuned.

The transferred power is then partly dissipated in resistor R2$x$, and then decreased by detuning of the oscillating circuit from $k_{opt|R2x}$.

The combination of formulas 13 and 14 provides:

$$\frac{V_{C2|R21}}{V_{C2|R20}} = \frac{\left(\frac{k}{k_{opt|R21}}\right)^2 + \frac{R21}{R20}}{\left(\frac{k}{k_{opt|R21}}\right)^2 + 1}. \quad \text{(Formula 18)}$$

When coupling k is equal to $k_{opt|R21}$, this relation becomes:

$$\frac{V_{C2opt|R21}}{V_{C2|R20}} = \frac{1 + \frac{R21}{R20}}{2}. \quad \text{(Formula 19)}$$

For a given coupling k, the value R2$x$ from which the critical optimum point will be have been reached can thus be evaluated based on the following relations:

$$V_{C2opt|R2x} = V_{C2|R20} \frac{1 + \frac{1}{\left(\frac{k}{k_{opt|R20}}\right)^2}}{2}. \quad \text{(Formula 20)}$$

with $$\left(\frac{k}{k_{opt|R2x}}\right)^2 = \frac{R20}{R2x}. \quad \text{(Formula 21)}$$

In practice, the smoothed voltage $V_{Ca}$ across the capacitor at the output of rectifying bridge 23 is measured, rather than directly measuring the voltage across the oscillating circuit. Voltage $V_{Ca}$ is proportional to voltage $V_{C2}$. Since voltage ratios are evaluated, it is not necessary to know the proportionality factor between voltages $V_{C2}$ and $V_{Ca}$. In a specific embodiment, the measurement is performed by the microprocessor. The storage of the values of the measured voltages is performed either by analog means or, preferably, digitally over several bits, the number of which depends on the desired accuracy of analysis.

Figure 5:
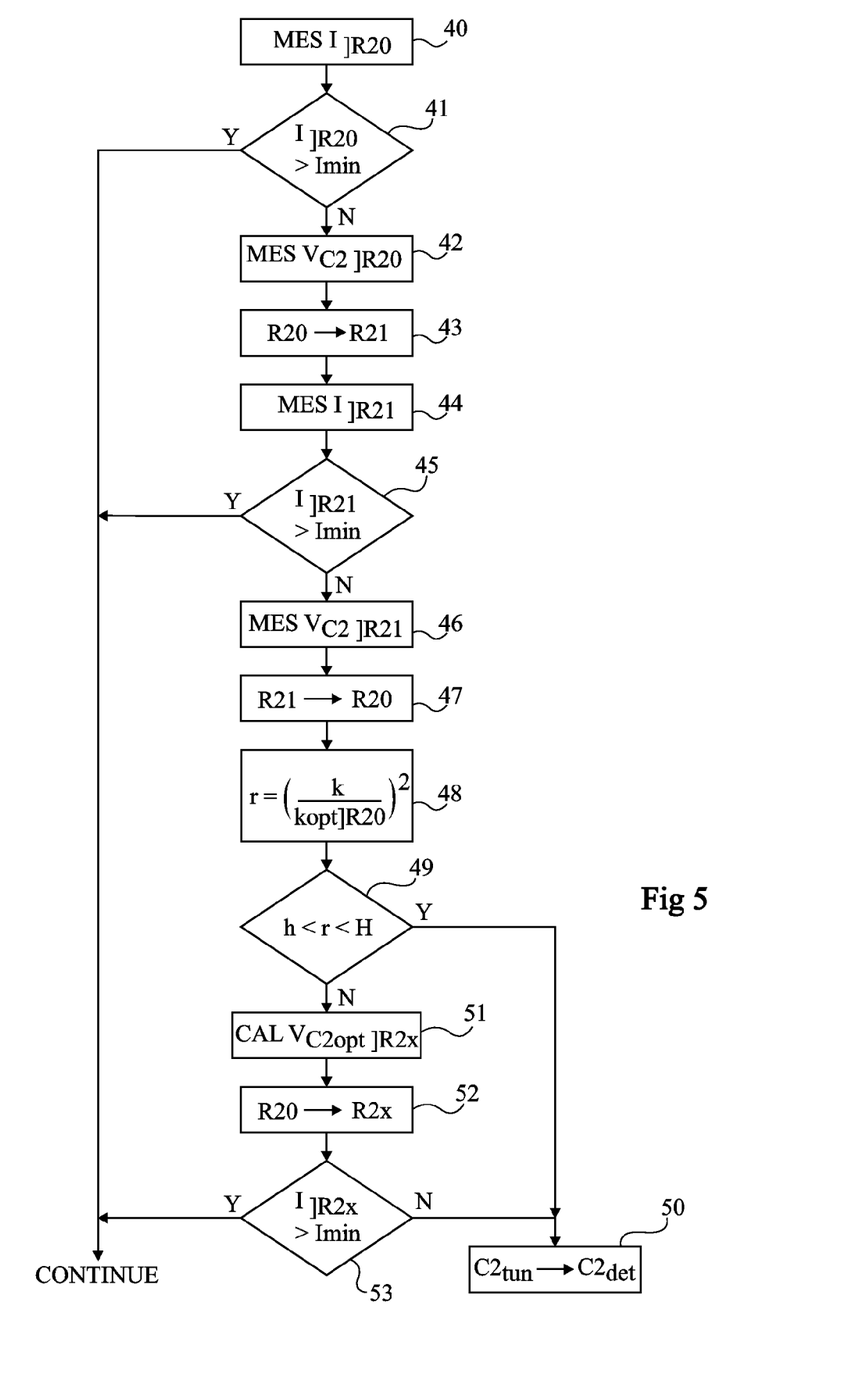
FIG. 5 is a functional block diagram illustrating an implementation mode of the coupling factor evaluation method.

FIG. 5 is a flowchart illustrating an embodiment of the power management method.

It is started (block 40, MES $I_{JR20}$) by measuring the current consumed in the transponder circuits. This measurement may be performed by means of a current detector associated with the voltage regulator or may be evaluated by the microprocessor based on the tasks that it executes.

A comparison (block 41, $I_{JR20} > I_{min}$) of measured value $I_{JR20}$ with a minimum value $I_{min}$ is performed. If the consumed current is greater (output Y of block 41), and thus sufficient, there is nothing to do and the monitoring mode is exited (CONTINUE).

Otherwise (output N of block 41), a measurement (bloc 42, MES $V_{C2JR20}$) of the voltage across the oscillating circuit in the current conditions is performed.

Then (block 43, R20->R21), the value of this resistance is switched to a lower value R21. The selection of a lower value R21 limits overheating risks.

A measurement (block 44, MES $I_{JR21}$) of the current consumed with resistance R21 is then performed. If (block 45, $I_{JR21} > I_{min}$) the resistance decrease has enabled to exceed the minimum current again (output Y of block 45), the problem has then been solved and the iteration of the power management program is exited (CONTINUE).

Otherwise (output N of block 45), a measurement (block 46, MES $V_{C2JR21}$) of the voltage with resistance R21 is performed to evaluate the position of the coupling with respect to the optimum coupling with resistance R20. This evaluation implies applying (block 48, $r=(k/k_{opt})^2$) formula 15 (or calculating a value representative of ratio r).

As soon as the measurement has been performed, it is returned to resistance R20 (block 47, R21->R20).

Ratio r is compared (block 49, h<r<H) with two thresholds h and H to determine whether it is within an acceptable range. For example, thresholds h and H are selected to correspond to the inflection points of the curve of FIG. 3, that is, h=⅓ and H=3. Other values may be selected provided, of course, for h to be smaller than one (preferably, h is greater than ½) and for H to be greater than one (preferably, H is smaller than 10).

If ratio r ranges between thresholds h and H (output Y of block 49), this means that the oscillating circuit can be detuned (block 50, $C2_{tun}$->$C2_{det}$) with no overheating risk. This detuning is then performed at a value $C2_{det}$ selected so that the voltage recovered by remote supply is sufficient for the transponder operation.

According to a first embodiment, if ratio r is outside of the determined range (output N of block 49), a calculation (block 51, $V_{C2opt]R2x}$) based on formulas 20 and 21 of value R2x of resistance R2 is performed to place the transponder back in an optimum coupling position. Then (block 52, R20->R2x), the value of resistance R2 is modified to this estimated value.

According to a preferred variation, the resistive load is progressively increased by decreasing the value of R2, until voltage $V_{C2}$ reaches value $V_{C2opt]R2x}$ calculated with formula 20.

As a variation, the microcontroller interrogates a previously-stored look-up table (for example, stored in a training phase or on design of the transponder) to know, based on the value of ratio r, the value to be given to resistance R2.

It is then tested (block 53, $I_{JR2x} > I_{min}$) whether, with this new resistance value R2x, the circuit power consumption is sufficient. If so (output Y of block 53), the power management iteration is exited. Otherwise (output N of block 53), the oscillating circuit is detuned (block 50).

Test 45 is optional. Indeed, the execution of the method may be continued to set to resistance R2x if the current coupling does not allow a detuning Test 45 however enables to exit the iteration faster if resistance R21 appears to be sufficient.

For simplification, the different tests consider strict inequalities. Of course, the operation should be selected in case of an equality. Each time, one or the other of the two options may be chosen. Further, it should be clear that the different measurements are stored to enable their exploitation by the microcontroller.

Figure 6:
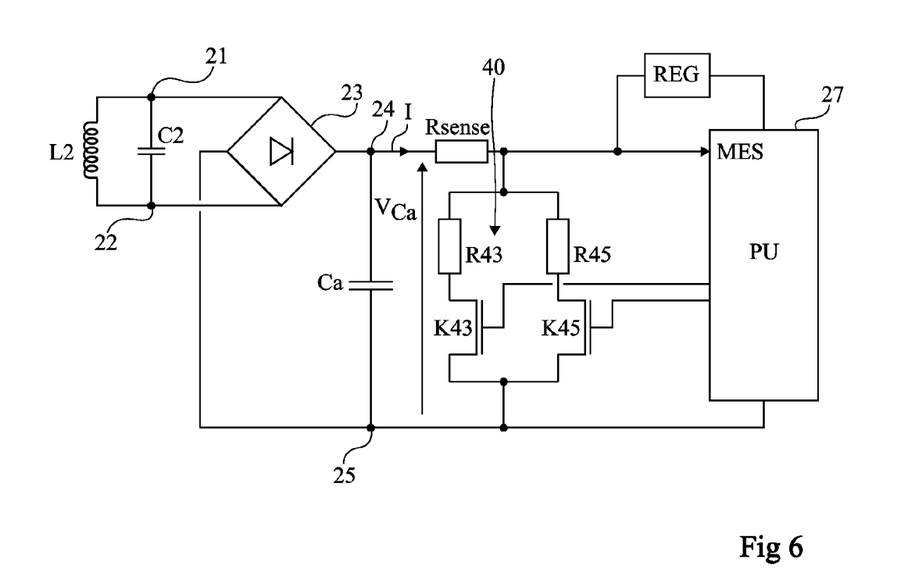
FIG. 6 is a block diagram of an embodiment of a transponder adapted to the implementation of the method.

FIG. 6 is a block diagram of an embodiment of a transponder 2, equipped to automatically determine, when it is in the field of a terminal (not shown), the current coupling with respect to the optimum coupling. The representation of FIG. 6 is simplified with respect to that of FIG. 2. In particular, the elements of demodulation, retromodulation, and for obtaining the clock frequency have not been illustrated.

The measurement of power consumption current I of the transponder circuit is performed by a resistor $R_{sense}$ assembled as a current detector. The measurement of the power consumption current provides an indirect image of the equivalent resistance of the load. It can thus be said that if the measured value is smaller than or equal to the minimum value, the consumed current will be low and that, in equivalent fashion, the resistance is smaller than value R20. In other words, if the current is smaller than the minimum current and coupling k is close to the optimum coupling, it can be deduced that the transponder is in resonant circuit overheating conditions.

As previously, transponder 2 is based on a parallel oscillating circuit L2-C2 having its terminals 21 and 22 connected to the input terminals of a rectifying bridge 23. Between terminals 24 and 25 of rectifying bridge 23, a switchable resistive circuit 40 is provided. For example, two resistors R43 and R45 are connected in parallel, each being in series with a switch K43, respectively K45. Switches K43 and K45 (for example, MOS transistors) are intended to be switched to implement the method for determining the coupling position. Processing unit 27 (PU) receives information relative to voltage $V_{Ca}$ on an input MES to implement the above-described method. In the example of FIG. 5, when both resistors R43 and R45 are functionally connected, resistor R2 (load of the transponder circuits) has value R20. The disconnection of one of the resistors (for example, resistor R43) increases resistance R2 towards value R21. Other connections and switchings may be provided according to the implemented variation of the method. For example, a single switchable resistor may be used, considering that one of the two values of resistance R2 corresponds to the resistive load of the other transponder circuits.

According to an embodiment, the switchable resistor corresponds to that used for a resistive retromodulation. A first measurement is performed by switching the retromodulation resistor so that it is functionally in the circuit (switch K30 in the on state in the example of FIG. 2). Voltage $V_{C2JR20}$ is measured. Then, switch K30 is turned off and voltage $V_{C2JR21}$ is measured. The implementation of the described method then requires no structural modification of a transponder equipped with a microcontroller. It is enough to program this microcontroller so that it thus switches the retromodulation resistance.

The thresholds exploited to determine the position with respect to the optimum coupling only depend on values R20 and R21 which are known for a given transponder. Accordingly, the transponder does not necessarily need advanced calculation means of microprocessor type but may simply measure the voltages, calculate the ratio, and compare it with analog thresholds generated, for example, by resistive dividing bridges. According to another example, the thresholds are pre-calculated and stored in a non-volatile memory of the transponder.

As a variation, the increase or the decrease of equivalent resistance R2 is caused by a variation of the power consumption of the transponder circuits, typically of processing unit 27. For example, to decrease the value of resistance R2 (increase the power consumption), the execution of calculations or processings by unit 27 is triggered. Equivalent resistance R2 may also be increased by decreasing the power consumption of unit 20 by interrupting certain calculations. The variation of resistance R2 is known from the moment that the power consumption of different tasks to be executed by unit 27 is known, which is generally estimated on design of the transponder or may be obtained in a training phase with any terminal.

The calculations required to evaluate the current coupling are sufficiently simple for their execution time to be negligible as compared with the speed at which a transponder passes in front of a terminal (and thus the variation speed of the coupling coefficient). The described embodiments are further applicable to the case where the transponder remains laid on a reception surface of the terminal, and where the coupling thus does not vary during the communication.

Figure 7:
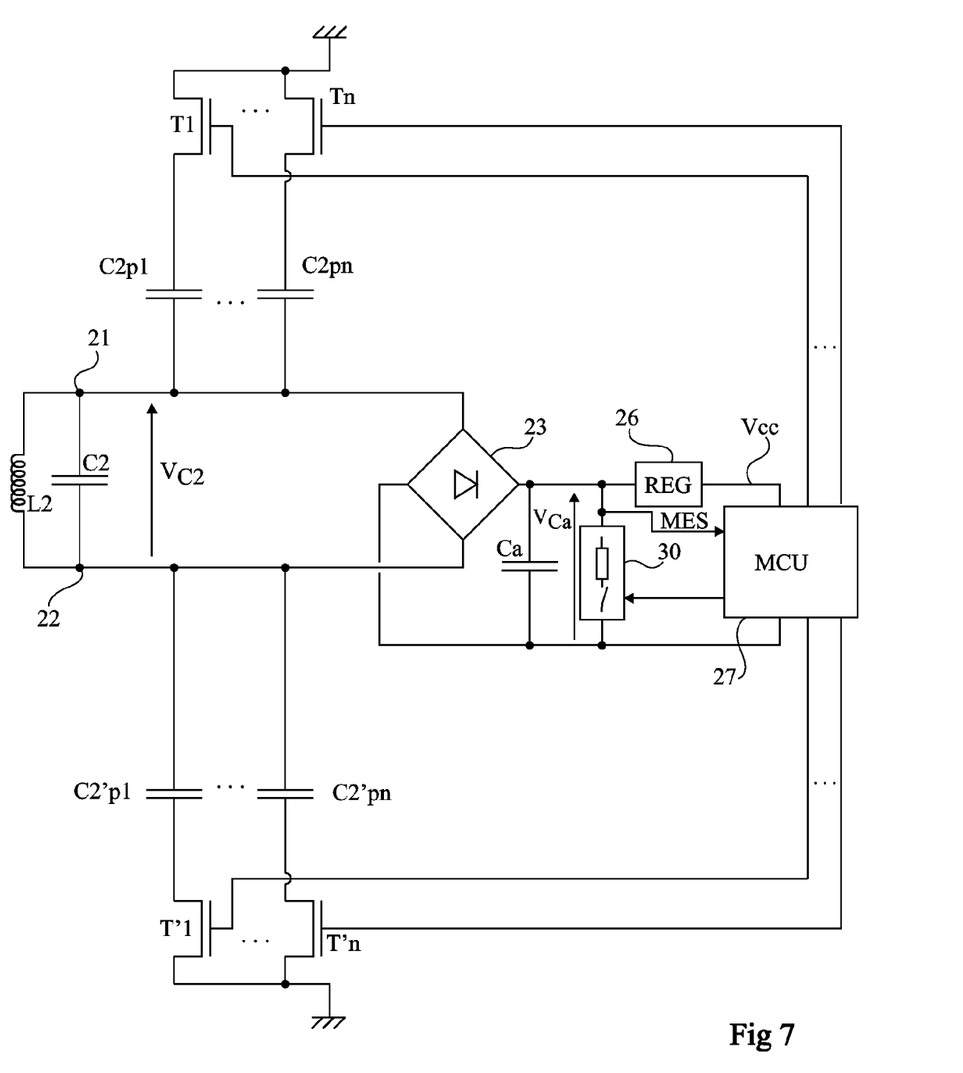
FIG. 7 is a block diagram of another embodiment of a transponder adapted to the implementation of the method.

FIG. 7 shows an embodiment of a transponder equipped with a circuit for detuning capacitor C2.

As previously, transponder 2 is based on a parallel oscillating circuit L2-C2 having its terminals 21 and 22 connected to the input terminals of a rectifying bridge 23. Processing unit 27 (PU) receives information relative to voltage $V_{Ca}$ on an input MES to implement the above-described method. The detuning is obtained by increasing the capacitance of the oscillating circuit, by placing in parallel capacitors C2$pi$ and C2'$pi$ (i ranging between 1 and n>=1), made switchable by switches (for example, MOS transistors) Ti and T'i. More specifically, at least one capacitor C2$pi$, respectively C2'$pi$, in series with a transistor Ti, respectively T'i, is connected between terminal 21, respectively 22, of resonant circuit L2-C2 and the ground. Transistors Ti are individually controllable by signals originating from microcontroller 27 according to the performed measurements, conditioning the desired amplitude for the detuning. As a variation, switchable capacitors are connected in parallel on the oscillating circuit. However, an advantage of the solution of FIG. 7 is that the transistors are easier to control since the control signals may be referenced to ground.

The circuits of FIGS. 6 and 7 may be combined.

The evaluation of the coupling may be performed periodically during a communication. The only precaution to be taken is not to evaluate the coupling during a retromodulation of the transponder. A first evaluation is for example performed as soon as the power recovered by the transponder is sufficient for microprocessor 27 to operate. Then, periodic measurements are performed during the communication.

Various embodiments with different variations have been described hereabove. It should be noted that those skilled in the art may combine various elements of these various embodiments and variations without showing any inventive step. In particular, the practical implementation of the invention by programming the microcontroller is within the abilities of those skilled in the art based on the functional indications given hereabove. Further, the calculations with formulas may be replaced with comparisons/selections of values stored in tables of the microcontroller.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for managing power in an electromagnetic transponder in a field of a terminal, comprising the steps of:
    evaluating a power consumption of a transponder circuit of the transponder;
    determining whether the power consumption is below a threshold;
    evaluating a current coupling factor between the transponder and the terminal in response to determining that the power consumption is below the threshold;
    causing an increase of the transponder power consumption based on evaluating the current coupling factor; and
    causing a detuning of an oscillating circuit of the transponder based on evaluating the current coupling factor.

2. The method of claim 1, wherein the detuning includes changing a value of the oscillating circuit to a value that maintains a remote supply of the transponder.

3. The method of claim 1, wherein evaluating the current coupling factor comprises:
    calculating a ratio of the current coupling factor of the transponder with an optimum coupling factor with a resistive load of the transponder; and
    comparing the ratio with at least one threshold.

4. The method of claim 3, wherein calculating the ratio includes:
    calculating a first value of a voltage across the oscillating circuit of the transponder for a first value of the resistive load;
    calculating a second value of the voltage across the oscillating circuit of the transponder for a second value of the resistive load; and
    calculating a ratio of the first value to the second value.

5. The method of claim 4, wherein:
    calculating the first value includes calculating a first value of a D.C. voltage provided by a rectifier across the oscillating circuit for the first value of the resistive load; and
    calculating the second value includes calculating a second value of said D.C. voltage for the second value of the resistive load.

6. The method of claim 5, wherein calculating the ratio of the current coupling factor of the transponder with the optimum coupling factor includes varying the resistive load between the first and second values by modifying a power consumption of processing circuits of the transponder.

7. The method of claim 5, wherein calculating the ratio of the current coupling factor of the transponder with the optimum coupling factor includes varying the resistive load between the first and second values by switching a resistive retromodulation element of the transponder.

8. An electromagnetic transponder comprising:
an oscillating circuit configured to provide an A.C. voltage when the transponder is in a magnetic field of a terminal;
a rectifying circuit configured to provide a D.C. voltage from the A.C. voltage and
at least one processing unit programmed to implement the method of claim 1.

9. The transponder of claim 8, further comprising at least one switchable resistive element capable of being functionally connected in parallel to the oscillating circuit.

10. The transponder of claim 8, further comprising at least one switchable capacitive element for detuning the oscillating circuit.

11. A method for controlling power in an electromagnetic transponder, comprising:
evaluating, by a controller of the transponder, a power consumption of circuits of the transponder;
determining whether the power consumption is below a threshold;
determining, by the controller whether a current coupling factor between the transponder and a terminal is within a prescribed range, in response to determining that the power consumption is below the threshold;
increasing, by the controller, the power consumption in response to determining that the current coupling factor is outside the prescribed range; and
detuning, by the controller, an oscillating circuit of the transponder in response to determining that the current coupling factor is within the prescribed range.

12. The method for controlling power as defined in claim 11, wherein evaluating the power consumption comprises measuring a current consumption of the circuits of the transponder.

13. The method for controlling power as defined in claim 12, wherein evaluating the power consumption further comprises comparing the measured current consumption with a minimum current value.

14. The method for controlling power as defined in claim 13, wherein no action is taken if the measured current is greater than the minimum current value.

15. The method for controlling power as defined in claim 11, wherein evaluating the current coupling factor comprises evaluating a ratio of the current coupling factor to an optimum coupling factor of the transponder.

16. The method for controlling power as defined in claim 15, wherein evaluating the current coupling factor further comprises comparing the ratio with upper and lower thresholds which correspond to upper and lower ends, respectively, of the prescribed range.

17. The method for controlling power as defined in claim 15, wherein evaluating the ratio comprises measuring a voltage across the oscillating circuit for two different power consumption values.

18. A method for controlling power as defined in claim 11, wherein increasing the power consumption comprises calculating a resistance value for optimum coupling and modifying a current resistance of the transponder to the calculated resistance value.

19. The method for controlling power as defined in claim 11, wherein detuning the oscillating circuit comprises modifying a capacitance value of the oscillating circuit.

20. An electromagnetic transponder comprising:
an oscillating circuit;
a rectifying circuit configured to provide a DC voltage when the oscillating circuit is in a magnetic field of a terminal; and
a processing unit configured to:
evaluate a power consumption of circuits of the transponder;
determine whether the power consumption is below a threshold;
determine, in response to determining that the power consumption is below the threshold, whether a current coupling factor between the transponder and the terminal is within a prescribed range;
increase the power consumption in response to determining that the current coupling factor is outside the prescribed range; and
detune an oscillating circuit of the transponder in response to determining that the current coupling factor is within the prescribed range.

21. The electromagnetic transponder as defined in claim 20, wherein the processing unit is configured to evaluate the power consumption by measuring a current consumption of the circuits of the transponder.

22. The electromagnetic transponder as defined in claim 21, wherein the processing unit is further configured to evaluate the power consumption by comparing the measured current consumption with a minimum current value.

23. The electromagnetic transponder as defined in claim 22, wherein no action is taken if the measured current consumption is greater than the minimum current value.

24. The electromagnetic transponder as defined in claim 20, wherein the processing unit is configured to evaluate the current coupling factor by evaluating a ratio of the current coupling factor to an optimum coupling factor of the transponder.

25. The electromagnetic transponder as defined in claim 24, wherein the processing unit is further configured to evaluate the current coupling factor by comparing the ratio with upper and lower thresholds which correspond to upper and lower ends, respectively, of the prescribed range.

26. The electromagnetic transponder as defined in claim 24, wherein the processing unit is configured to evaluate the ratio by measuring a voltage across the oscillating circuit for two different power consumption values.

27. The electromagnetic transponder as defined in claim 20, wherein the processing unit is configured to increase the power consumption by calculating a resistance value for optimum coupling and modifying a current resistance to the calculated resistance value.

28. The electromagnetic transponder as defined in claim 20, wherein the processing unit is configured to detune the oscillating circuit by modifying a capacitance value of the oscillating circuit.

* * * * *